(12) United States Patent
Morgan

(10) Patent No.: US 7,047,873 B2
(45) Date of Patent: May 23, 2006

(54) LAYERED DOME CAKE ASSEMBLY

(76) Inventor: Fletcher Morgan, 4990 Coquina Key Dr., SE., St. Petersburg, FL (US) 33705

( * ) Notice: Subject to any disclaimer, the term of this patent is extended or adjusted under 35 U.S.C. 154(b) by 394 days.

(21) Appl. No.: 10/294,676

(22) Filed: Nov. 15, 2002

(65) Prior Publication Data

US 2004/0094042 A1     May 20, 2004

(51) Int. Cl.
*A47J 43/18* (2006.01)
(52) U.S. Cl. ............... 99/428; 99/426; 99/DIG. 15; 249/DIG. 1
(58) Field of Classification Search .......... 99/DIG. 15, 99/428, 439, 426; 249/DIG. 1; 220/573.1, 220/573.2, 912
See application file for complete search history.

(56) References Cited

U.S. PATENT DOCUMENTS

| | | | |
|---|---|---|---|
| 1,487,906 A | 3/1924 | White et al. | |
| 3,296,956 A | 1/1967 | Turner | |
| 3,545,645 A * | 12/1970 | Smith | 220/658 |
| 3,831,507 A | 8/1974 | Wheaton | |
| 4,607,613 A * | 8/1986 | Toldi | 126/215 |
| 4,812,323 A | 3/1989 | Savage | |
| 5,046,633 A * | 9/1991 | Chung | 220/574.3 |
| 5,601,012 A | 2/1997 | Ellner | |
| 5,948,313 A | 9/1999 | Cahen | |

* cited by examiner

*Primary Examiner*—Reginald L. Alexander
(74) *Attorney, Agent, or Firm*—John S. Hale; Gipple & Hale

(57) ABSTRACT

An apparatus assembly for forming a layered dessert in a predetermined layered dome forming a hemispheric shape including a first mold having a dome shaped bowl with a closed semi-spherical end and an open end, and a ring shaped planar support base secured to said closed end of bowl body. A second mold comprises a circular pan with a flat bottom surface and a curved outer side extending upward from the bottom surface with the area formed by a plane across the top of the curved outer side, the inner surface curved side and the bottom surface forming a section of a sphere. A lip is formed on both molds extending outward from the open end.

20 Claims, 5 Drawing Sheets

LAYERED DOME CAKE ASSEMBLY

CROSS-REFERENCE TO RELATED APPLICATIONS

A United States Design Patent Application, as shown in FIG. 1 of this Application, Ser. No. 29/171,006, was filed Nov. 15, 2002.

TECHNICAL FIELD OF THE INVENTION

The present invention relates generally to the field of cake baking and desert molds. More particularly, the present invention concerns apparatus for baking a domed, semi-spherical or hemispherical cake or molded dessert. The present invention thus relates to an apparatus assembly for baking a shaped type of dessert that can be termed a domed hemispherical or semi-spherical dome cake and/or combination dessert mold.

The present invention is thus directed toward an apparatus for molding cake batter, ice creams, gelatins or other desserts into a particular hemispherical shape while setting or being baked. The invention particularly concerns a pan assembly which molds and/or bakes cakes or desserts in the shape of a layered hemispherical dome.

BACKGROUND OF THE INVENTION

A number of devices have been used in the molding and baking of desserts to obtain molded desserts in a variety of configurations. Molded dessert apparatus for a variety of shaped configurations have been described in the prior art but domed desserts are somewhat rare because of the complexity in preparing same. While cakes are commonly referred in the literature to as being domed, in effect this is an occurrence which comes about as the batter expands during baking and does not equate to a hemispherical or semispherical shaped cake.

Historically, it was known in the prior art to bake bread bowls which were semi-spherical loaves of hollow cavity bread into which salads or soups could be placed. A conventional bread bowl is typically made by forming raw bread dough on the top of a simple inverted bowl which is then placed into the oven for baking. Bread bowls made in this manner often rise from the inverted bowl so that the same presents an uneven appearance, requiring trimming and waste.

Hemispherical shaped or dome cakes are popular in Italian dessert cooking and are generally known as "Zuccotto". These cakes are prepared by slicing previously baked sponge cake (Pan di Spagna) into thin, vertical slices, lining the interior of a bowl with plastic wrap and lining the plastic wrap in the bowl with overlapping pieces of the sponge cake slices. The slices of cake are then sprinkled with liquor and the dampened assembly is then covered with a plastic wrap and refrigerated. A center mixture of chocolate or other filling is poured into the cake lined bowl and the bottom or exposed surface of the filling is covered with other slices of cake. The entire cake is allowed to set for a number of hours, preferably overnight, inverted onto a platter and dusted with confectioners sugar. As can be seen, the process for making this cake is quite laborious in time and resources required. It has been found desirable to mold or form desserts or cake into a layered hemispherical or semi-spherical dome shape which can be baked and/or frozen and marketed as a specialized cake shape similar to the Italian "Zuccotto" cakes as the same make an elegant presentation. "Batter" as used herein in the application is meant to encompass cake batter, malleable ice cream, gelatin or a malleable dessert which sets up in a rigid or semi-rigid shape.

Many prior art devices and techniques mold and bake dough of breads, batters of cakes, cookies, and other baked goods into various shapes including containers which may be used to hold other foods. For example, U.S. Pat. No. 4,812,323, issued Mar. 14, 1989, discloses a method for molding and baking cookie dough into a cup shape which can then be used to hold ice cream or other fillings as does U.S. Pat. No. 3,296,956, issued Jan. 10, 1967, which also discloses a molding and baking apparatus for the baking of bread dough into a cup-like shape. U.S. Pat. No. 1,487,906, issued Mar. 25, 1924, discloses a pan for baking cake batter into a container shape for holding ice cream.

U.S. Pat. No. 5,601,012, issued Feb. 11, 1997 discloses a baking bread bowl with a flat bottom and an outwardly extending flange to produce a uniformly shaped bread bowl. This bowl has a concavo-convex body with an outer extending edge flange which extends from the open edge and doubles back from the axially outermost extent to form a raised edge. This construction and shape was arrived at to attempt to solve the above noted problem with existing bread bowls.

Another prior art reference is a U.S. Pat. No. 5,948,313, issued Sep. 7, 1999 which is directed toward a mold assembly for making a baked edible shell. The mold assembly is constructed of an outer mold shell and an associated inner mold shell, the outer mold shell having a curved main portion with a central opening and an outer rim extending in a plane. The inner mold shell has a curved main portion with a central chimney shaped to pass through the outer mold central opening. The outer mold opening comprises a raised circular rim with an inwardly directed flange. The outer edge of the outer mold shell is formed with a rolled-up rim. When the edible material is being cooked, a metal strip with curved ends is mounted over the rolled rim of the outer shell mold as seen in FIGS. 4 and 5C issued to hold both mold-shells in relative positions to eliminate expansion of the edible material during cooking.

A baked layered product with an apparatus for making same is shown in U.S. Pat. No. 3,831,507, issued Aug. 27, 1974. This baking assembly uses three baking pans to form a cylindrical bunt bowl body and lid which is placed over the body.

In all baking pans, it is desirable to facilitate the partial escape of moisture from these apparatuses in order to develop a degree of porosity in the final baked product. The present invention solves the complex construction problems in assemblying a domed cake or dessert through the use of a simple apparatus.

SUMMARY OF THE INVENTION

The present invention is directed toward an apparatus for producing a layered semi-spherical or hemispherical dessert or cake using a dome shaped bowl with a ring member support base and a flat surfaced circular base pan having a side wall forming a section of a sphere for the base layer. The combined cake sections from each of the pans are stacked to form a semi-spherical or hemispherical configuration. Both the bowl and base pan have a round lip extending outward at the end surface of the open end and extending around the circumference of the open end allowing the same to be easily grasped and handled by the user.

It is an object of the invention to provide a cooking assembly for baking a cake that produces a uniformly shaped dome shaped layered cake that is resistant to tilting and rolling.

It is another object of the invention to provide a cooking assembly which delivers heat energy evenly to all areas of the cake batter being baked.

Yet another object of the invention is to provide an apparatus that is easy to use, ruggedized and reliable.

Another object of the invention is to provide an cooking assembly which is easy to clean.

Another object of the invention is to provide a cooking assembly for baking a hemispherical cake that produces a uniform cake that is predictable and reproducible decreasing variance.

Still another object of the invention is to provide a cooking assembly that has one or more of the characteristics discussed above but which is relatively simple to use and requires a minimum of cooking skills.

In the accompanying drawings, there is shown illustrative embodiments of the invention from which these and other objectives, novel features and advantages will be readily apparent.

These and other objects, advantages, and novel features of the present invention will become apparent when considered with the teachings contained in the detailed disclosure along with the accompanying drawings.

DETAILED DESCRIPTION OF THE INVENTION

Figure 1:
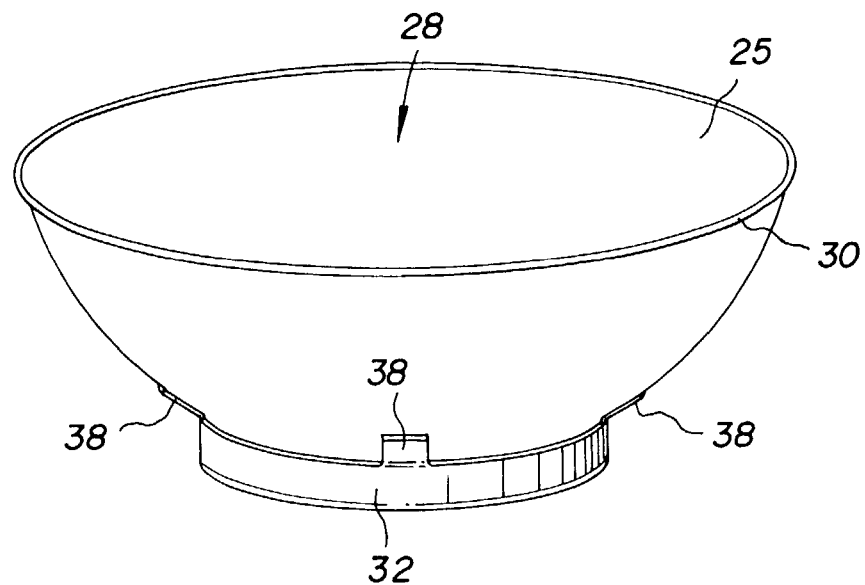
FIG. 1 is a perspective view of the top dome component of the present invention.
Figure 2:
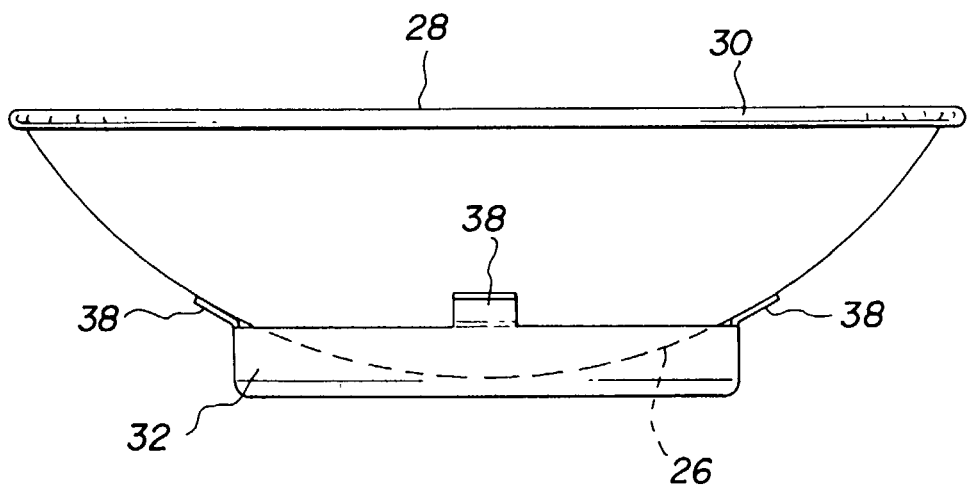
FIG. 2 is a front elevational view of the top dome component of FIG. 1.
Figure 3:
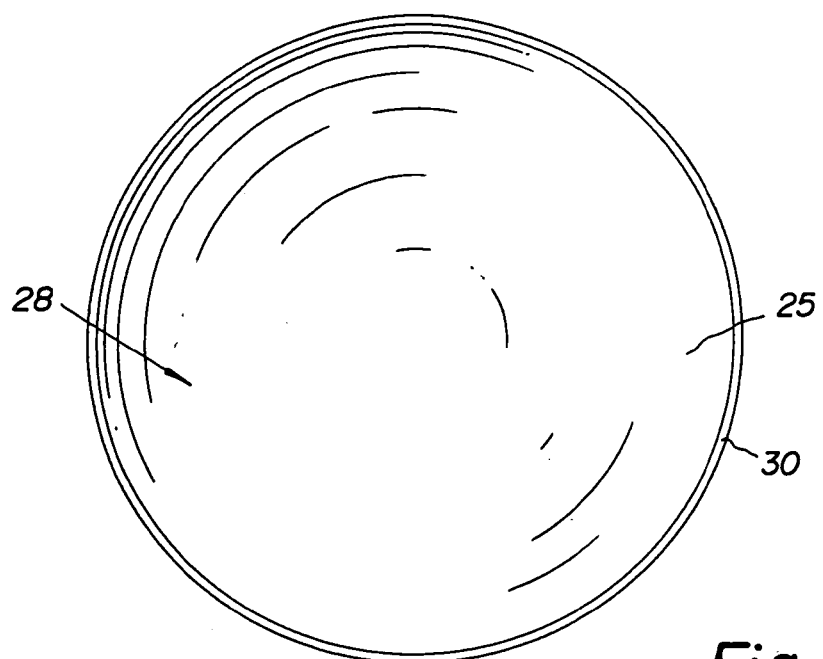
FIG. 3 is a top plan view of the top dome component of FIG. 1.
Figure 4:
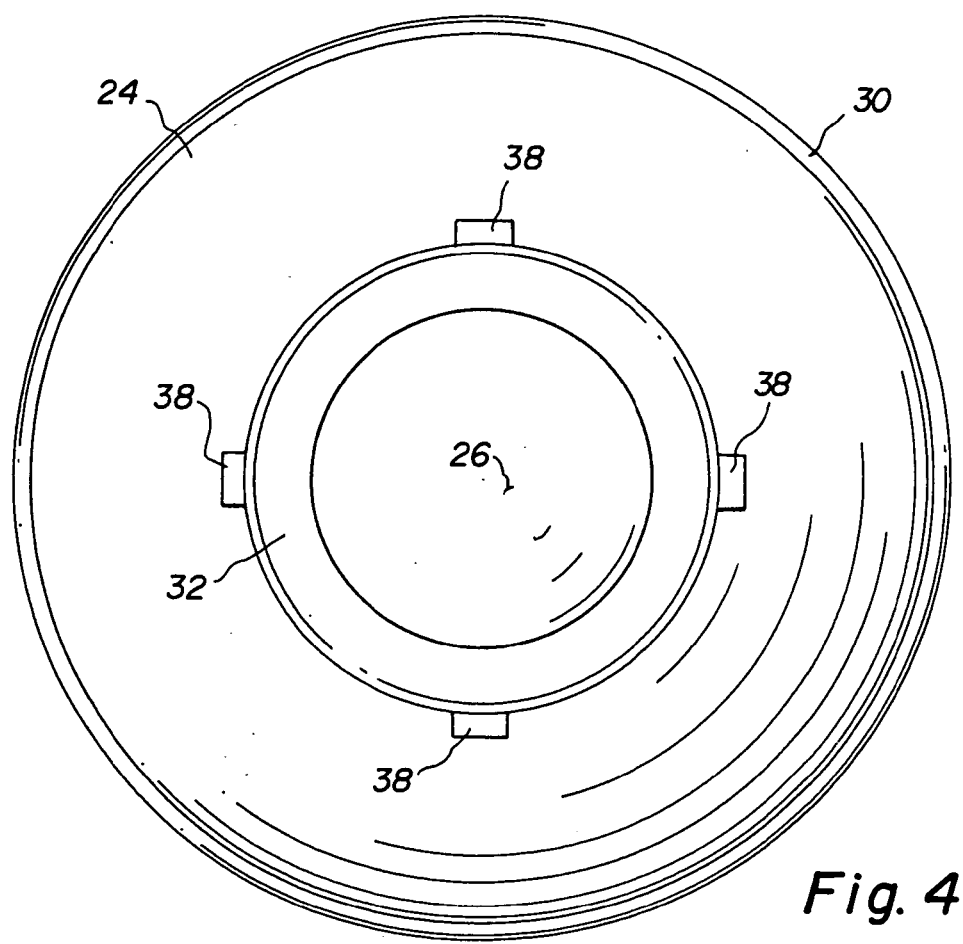
FIG. 4 is a bottom plan view of the top dome component of FIG. 1.
Figure 5:
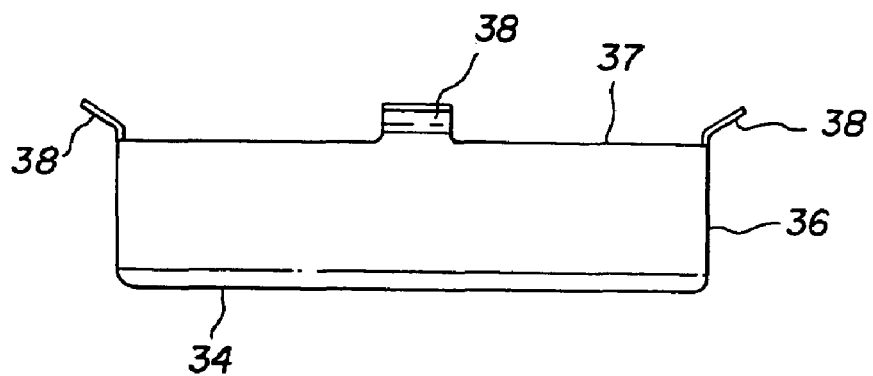
FIG. 5 is a side elevational view of the base ring of the top dome component of FIG. 1 removed from the top dome.
Figure 6:
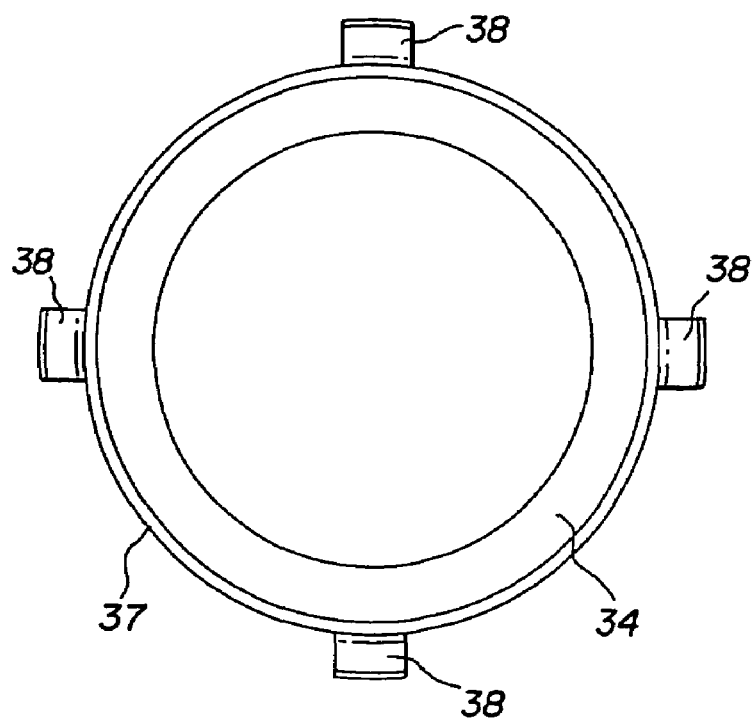
FIG. 6 is a top plan view of the base ring shown in FIG. 5.
Figure 7:
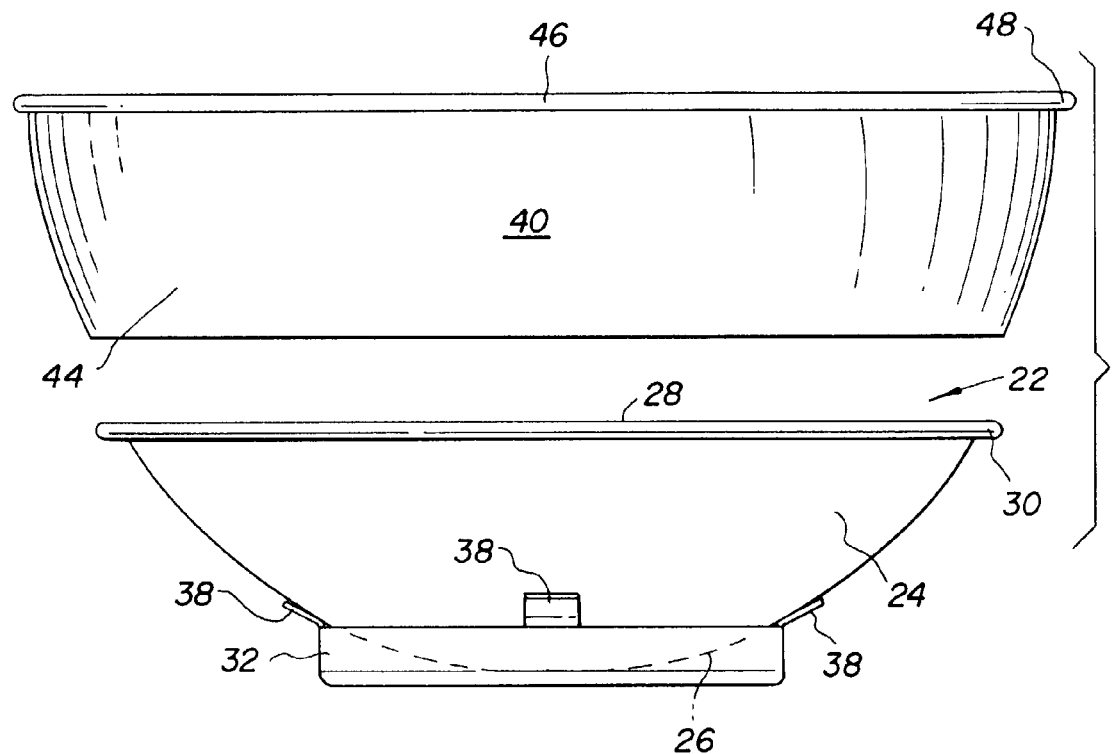
FIG. 7 is an exploded elevational view of the top dome component pan and the base layer component pan.
Figure 8:
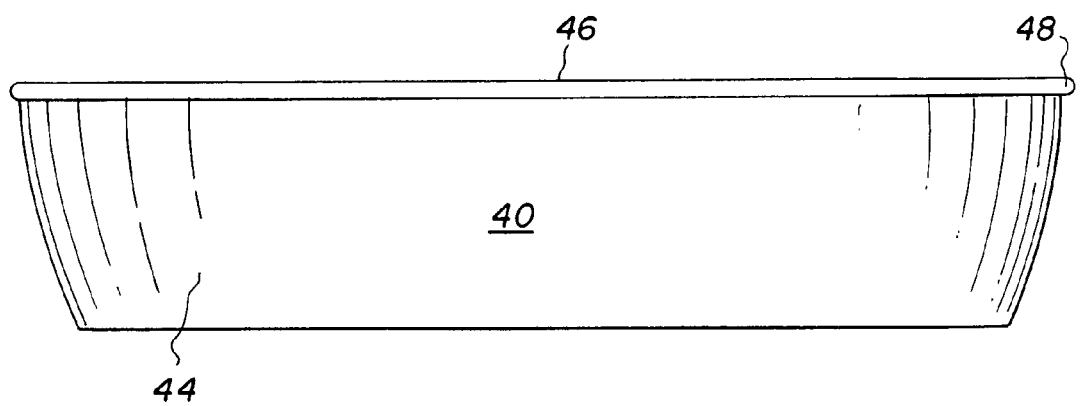
FIG. 8 is a side elevational view of the base layer component pan.
Figure 9:
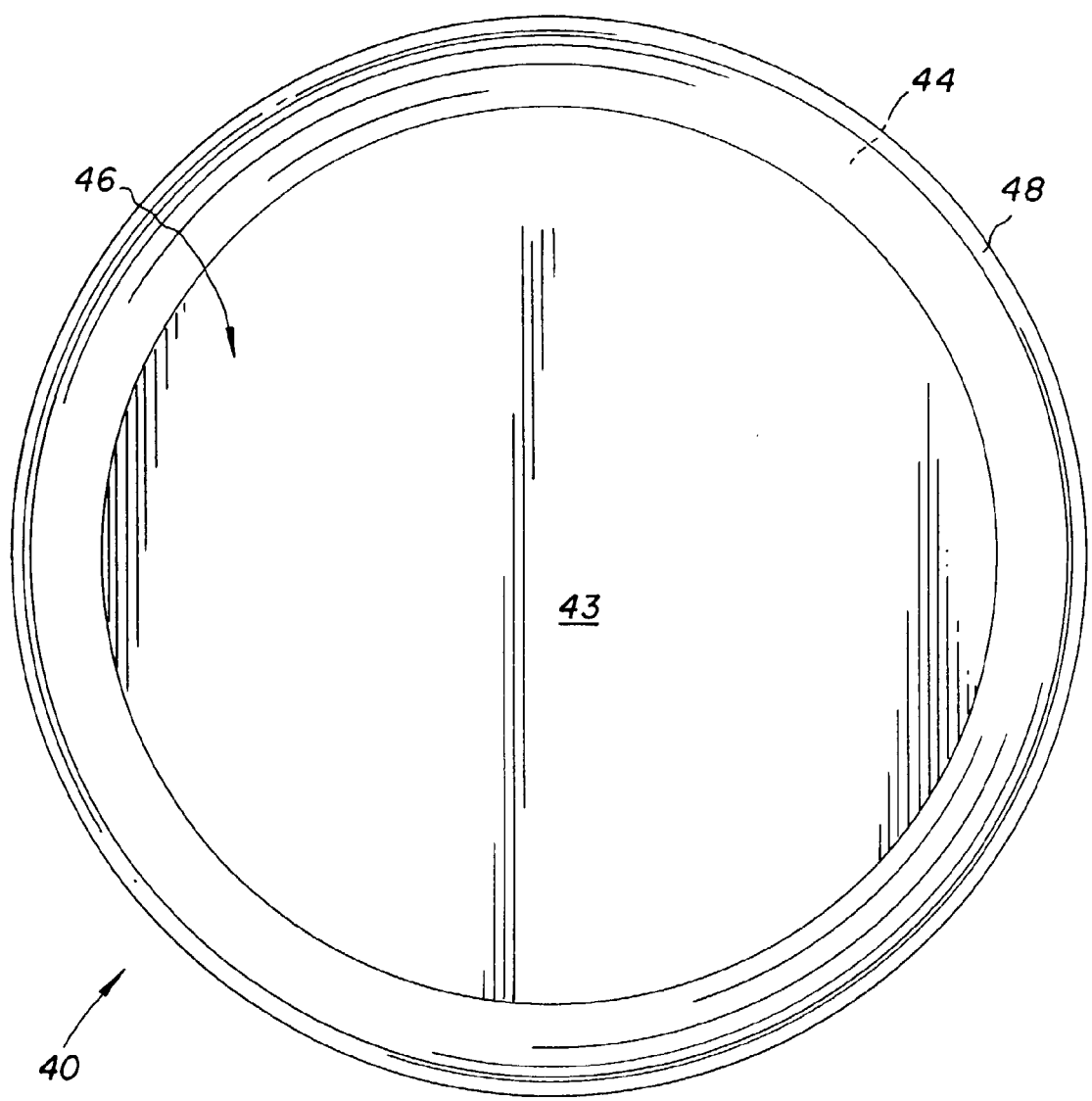
FIG. 9 is a top plan view of the base layer component pan of FIG. 8.

The preferred embodiment and best mode of the invention is shown in FIGS. 1 through 9.

Referring to the Figures, a molding and baking pan assembly 20 according to the invention is adapted to shape or mold cake batter other baking goods or complimentary desserts such as ice cream gelatins, puddings into a domed layered dessert having a semispherical or hemispherical shape.

The top dome pan 22 is typically symmetrical with a concavo-convex semi-spherical shape. The top dome pan is constructed with a bowl body 24 having a spherical or curved closed bottom surface 26 and an open end 28 provided with a curved or rolled outer lip or rim 30. The outer lip 30 extends outward and preferably has a diameter of 0.25 inches. It will be appreciated that the rim 30 will permit a pair of human hands or a tool such as a wooden handle to reach under and grasp the bowl body 24 or the curved base layer pan 40. A base ring member 32 is secured to the bottom surface 26 of the bowl body 24 to provide a flat base surface during working and/or cooking. The ring member 32 is preferably constructed of 22 gage C1018 cold rolled steel with an inwardly curved bottom planar flange 34, and a vertical side wall 36 having a top edge 37 which has four tabs 38 outwardly extending therefrom bent at an angle ranging from about 120° to 130°, preferably about 124°. The ring member 32 is secured to the base section of the bowl body 24 by welding or braising and has a cross section forming a "L" shape with the leg or flange 34 being about 1 inch wide forming a planar surface for seating the bowl in a stable condition. Each tab 38 is positioned on the ring circumference 90° from the other adjacent tabs located on the circular top edge 37 and has a length of approximately 1 inch. The base ring 32 preferably has a diameter of 3.5 inches and a height of about 0.5 inches when used with a 6.75 inch inner diameter bowl having a depth of 1.875 inches. When ring member 32 is mounted or secured to the bowl body, there is a clearance ranging from 0.125 to 0.50 inches from the bottom lowest outer surface of the bowl to the top of the support area upon which the ring member 32 is seated.

If desired, a bi-metallic thermometer can be attached to the ring member 32 which thermometer would turn an appropriate color upon reaching the desired cooking temperature allowing the cook to ascertain that the desired temperature has been reached.

The bowl body 24 is preferably integrally constructed of sheet steel or stainless steel but can be constructed of copper or aluminum at a uniform thickness of approximately 0.045–0.05 inches. If desired, the bowl body can have its external surface coated with a non-corroding material such as tin or chromium. The bowl 24 therefore may be constructed of a single sheet of metal formed into the desired shape. The inside surface 25 of the bowl is preferably coated with one or more nonstick coatings, such as for example TEFLON® (i.e., fluorocarbon polymers), (e.g., tetrafluoroethylene and fluorinated ethylene propylene). The interior surface 25 of the bowl 24, which contacts the batter or dessert composition, is covered with TEFLON® in the preferred embodiment to ease the removal of the baked or chilled product from the bowl. The radial sloping of the inner wall 25 further eases removal of the final dessert composition. It will be appreciated by those skilled in the art that other shapes and geometries of pan assemblies are possible, and that the specifics of material of which it is made can be changed without departing from scope of the invention. For example, the mold may be formed as a cone, or other shape. Additionally, it can be stamped from a solid piece of material or spun from aluminum instead of formed from a sheet.

The base layer of the dessert or cake is obtained using a circular curved sided bake pan 40 having a flat bottom surface 42 which is approximately the same diameter as the interior diameter of the opening 28 of the dome bowl pan 24, namely, 6.75 inches and has a depth of 1.875 inches. The exterior wall 44 of the base layer pan is curved on a similar radius as that of the dome pan and has an open top 46 with an inner diameter of 8.0 inches and a round lip or rim 48 extending around the outer surface of the circular upper edge. The opening of the base layer pan has an external diameter of 8.25 inches.

After the batter is molded and baked by the application of heat to the pans 24 and 40, the cake layers are removed and the dome portion of the cake is stacked on the base portion of the cake which has a layer of icing or confectionary coating. The TEFLON® coating of the interior surface 25 of the dome mold and the bottom surface 43 and curved wall 44 of the base layer pan facilitates removal of the baked product without tearing or damaging the final baked product. The result is a baked layer cake or dessert which is domed shaped as a hemisphere and ready to eat. The baked goods may be filled or coated with ice cream, pudding, icing or other sweet filling for a dessert pastry.

The cooking assembly can be enhanced by providing additional shaped lips for handling. Similarly, although aluminum, sheet steel and/or stainless steel is preferred for the concavo-convex body and the base pan, any suitable structural material could be used in its place, as for example, alloyed steel, copper, brass, cast iron or even glass or ceramic, such as stoneware. The individual framework components need not be fabricated from the disclosed materials, but could be fabricated from virtually any suitable materials.

The principles, preferred embodiments and modes of operation of the present invention have been described in the foregoing specification. However; the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. An apparatus assembly for forming a layered dessert in a predetermined shape comprising a plurality of mold members, each mold member forming a separate layer of said layered dessert:
    a first mold member having a dome shaped bowl body with a closed semi-spherical end and an open end, said open end defining a lip extending outward from said bowl open end, said bowl body forming a top layer of a layered dessert, a planar support base secured to said closed end of said bowl body; and
    a second mold member comprising an open circular pan with a flat bottom surface, a curved side wall extending upward from said bottom surface, the area formed by a plane across the top of the curved side wall, the curved side wall inner surface and the bottom surface forming a section of a sphere and a lip extending outward from an upper end of said curved side wall, said pan forming a support layer of said layered dessert supporting said top layer.

2. An apparatus assembly as claimed in claim 1 for forming a layered dessert in a predetermined shape wherein said bowl is semi-spherical and the inner surface of said dome shaped bowl and said circular pan are coated with a nonstick material.

3. An apparatus assembly as claimed in claim 2 for forming a layered dessert in a predetermined shape wherein said nonstick compound is tetrafluroethlene.

4. An apparatus assembly as claimed in claim 2 for forming a layered dessert in a predetermined shape wherein said nonstick compound is fluorinated ethylene propylene.

5. An apparatus assembly as claimed in claim 1 for forming a layered dessert in a predetermined shape comprising wherein said planar support base is a ring member.

6. An apparatus assembly as claimed in claim 5 for forming a layered dessert in a predetermined shape wherein said ring member has a plurality of tabs extending away from an axis taken through the center of the ring member.

7. An apparatus assembly as claimed in claim 6 for forming a layered dessert in a predetermined shape wherein said tabs are positioned on an edge of said ring and are located 90° from each other.

8. An apparatus assembly as claimed in claim 6 for forming a layered dessert in a predetermined shape wherein said tabs extend outward from an axis through the center of the ring member at an angle ranging from about 120° to about 130°.

9. An apparatus assembly as claimed in claim 6 for forming a layered dessert in a predetermined shape wherein said tabs extend outward from an axis through the center of the ring member at an angle ranging about 124°.

10. An apparatus assembly as claimed in claim 5 wherein said ring member has an "L" shaped cross section.

11. An apparatus assembly as claimed in claim 5 wherein said ring member has a bottom flange extending toward the center axis of said ring, said bottom flange having a planar bottom surface.

12. An apparatus assembly as claimed in claim 5 for forming a layered dessert in a predetermined shape wherein said bowl is seated in said ring against tabs extending from an upper surface of said ring with the bottom of the bowl being raised above a plane taken across the bottom edge of said ring.

13. An apparatus assembly as claimed in claim 12 for forming a layered dessert in a predetermined shape wherein said bowl is raised from about 0.125 inches to 0.50 inches from said plane taken across the bottom edge of said ring.

14. An apparatus assembly for forming a layered dessert in a predetermined shape comprising a plurality of mold members, each mold member forming a layer of said layered dessert:
    a first mold member having a dome shaped bowl body with a closed semi-spherical end and an open end, defining a lip extending outward from said bowl open end, said bowl body forming a toy layer of a layered dessert, a planar support base secured to said closed end of said bowl body, said planar support base comprising a ring member secured to the base of said dome shaped bowl, said ring member being formed with a vertical side wall and a formed bottom flange extending inward from said vertical side wall toward the center axis of said ring member, said flange defining a planar bottom surface;
    a second mold member comprising an open circular pan with a flat bottom surface, a curved outer side extending upward from said bottom surface, and a lip formed on an upper end of said sidewall said pan forming a lower layer of said layered dessert.

15. An apparatus assembly as claimed in claim 14 for forming a layered dessert in a predetermined shape wherein said bowl is semi-spherical and the inner surface of said dome shaped bowl mold and said second mold are coated with a nonstick material.

16. An apparatus assembly as claimed in claim 15 for forming a layered dessert in a predetermined shape wherein said nonstick compound is tetrafluroethlene.

17. An apparatus assembly as claimed in claim 15 for forming a layered dessert in a predetermined shape wherein said nonstick compound is fluorinated ethylene propylene.

18. An apparatus assembly as claimed in claim 14 for forming a layered dessert in a predetermined shape wherein said ring member has a plurality of tabs extending away from an axis taken through the center of the ring member, said tabs extending outward from an axis through the center of the ring member at an angle ranging from about 120° to about 130°.

19. An apparatus assembly as claimed in claim 18 for forming a layered dessert in a predetermined shape wherein said tabs are positioned on an edge of said ring and are located 90° from each other.

20. An apparatus assembly for forming a dessert in a predetermined shape comprising:

a mold in the form of a dome shaped bowl body with a closed semi-spherical end and an open end, and a lip extending outward from said bowl open end, a planar support base secured to said closed end of said bowl body, said planar support base comprising a ring member secured to the base of said dome shaped bowl body, said ring member being formed with a vertical side wall and an inwardly formed flange extending inward from said vertical side wall toward the center axis of said ring member, said flange defining a planar bottom surface.

\* \* \* \* \*